US006698011B1

(12) United States Patent
Reinders et al.

(10) Patent No.: US 6,698,011 B1
(45) Date of Patent: Feb. 24, 2004

(54) ISOLATION OF PROGRAM TRANSLATION FAILURES

(75) Inventors: James R. Reinders, Portland, OR (US);
Joe H. Wolf, III, Aloha, OR (US);
Matthew E. Frazer, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/240,165

(22) Filed: Jan. 29, 1999

(51) Int. Cl.[7] .............................. G06F 9/44; G06F 9/45; H02H 3/05
(52) U.S. Cl. ....................... 717/124; 717/136; 717/141; 714/48; 714/38
(58) Field of Search ................. 717/4, 5, 7, 8, 717/9, 1, 2, 3, 136–137, 139, 140–143, 146–148, 124, 126, 128, 130–131; 714/26, 38, 48, 52

(56) References Cited

U.S. PATENT DOCUMENTS

| 5,193,190 A | * | 3/1993 | Janczyn et al. | 717/156 |
| 5,301,325 A | * | 4/1994 | Benson | 717/159 |
| 5,432,795 A | * | 7/1995 | Robinson | 717/125 |
| 5,598,560 A | * | 1/1997 | Benson | 717/159 |
| 5,815,720 A | * | 9/1998 | Buzbee | 717/158 |
| 5,854,924 A | * | 12/1998 | Rickel et al. | 717/132 |
| 5,854,928 A | * | 12/1998 | Buzbee | 717/158 |
| 6,052,530 A | * | 4/2000 | Buzbee et al. | 717/153 |
| 6,119,206 A | * | 9/2000 | Tatkar et al. | 717/147 |
| 6,308,318 B2 | * | 10/2001 | Krishnaswamy | 717/139 |
| 6,311,221 B1 | * | 10/2001 | Raz et al. | 709/231 |

* cited by examiner

Primary Examiner—Antony Nguyen-Ba
(74) Attorney, Agent, or Firm—Schwegman, Lundberg, Woessner & Kluth, P.A.

(57) ABSTRACT

A method and system of transforming a source code file to obtain a reduced size source code file. In one embodiment, a source code file is translated to obtain a translation error list. The source code file is transformed to obtain a reduced size source code file, which is a test case file that is equivalent to the source code file. In one embodiment, a source code file is translated to obtain a translation error list and a reduced size source code file is automatically translated to obtain a reduced size source code file translation error list. The error lists are compared in order to determine whether the reduced size source code file is an equivalent test case for the source code file.

27 Claims, 6 Drawing Sheets

FindErrors

ATTEMPT TO REMOVE ALL OBJECTS
IF UNABLE TO REMOVE ALL OBJECTS
THEN
WHILE NUMBER OF NONE-ERRORS OBJECTS
    IS GREATER THAN ZERO
IF MORE THAN X OBJECTS,
THEN
 CALL DivideNConquer
ELSE
 CALL OneAtTime
END WHILE

DivideNConquer

IF SECOND HALF OF FILE NOT PROCESSED,
THEN
 PROCESS SECOND HALF OF FILE FROM BACK TO FRONT
 (INCLUDES RECURSIVE CALL TO DivideNConquer
 AND CALLS TO OneAtTime)
ELSE
 PROCESS FIRST HALF OF FILE FROM BACK TO FRONT
 (INCLUDES RECURSIVE CALL TO DivideNConquer
 AND CALLS TO OneAtTime)

OneAtTime

WHILE (NON-ERROR OBJECTS)
 REMOVE LAST OBJECT OF FILE
IF COMPARE FAILED AND OBJECT ATTEMPTED TO
REMOVE CONTAINS BLOCK OBJECT
THEN
 CALL FindErrors
END WHILE

Figure. 4

ISOLATION OF PROGRAM TRANSLATION FAILURES

FIELD OF THE INVENTION

The present invention relates to the translation of a computer program source code file. In particular, it relates to isolating program translation failures to a small area of the program source code.

BACKGROUND OF THE INVENTION

An application program can occupy hundreds of source code files consisting of thousands of lines of code. Translating such an application program may consume many hours of computer time. Translating includes any transformation of data from one form to another, such as compiling, assembling, or interpreting. After translating the program, an expert can expend many more hours studying the code to determine the source of any translation errors and modifying the code to eliminate those errors. Often, the application program is proprietary, and the experts at debugging translation errors are not employees of the application program owner. In this case, the application program owner is often reluctant to provide access to the proprietary program to the translation process expert, and instead provides the translation process expert with an abstracted description of the source code believed to cause the error. Unfortunately, this process is inefficient and expensive, since the expert suggests a solution, without examining the source code file, and the suggested solution often does not correct the problem.

Debugging translation errors in a large application program is also a very complicated process involving complex interactions between the application program and the translator. Application program experts often have difficulty isolating source code translation errors without assistance from experts in translator operation. This assistance is often provided for many weeks to debug a large application, and in the case of an application designed to operate on a new microprocessor, the assistance is often provided for many months. Unfortunately, translator experts are in short supply, so the development of many applications falls behind schedule.

For these and other reasons, there is a need for the present invention.

SUMMARY OF THE INVENTION

In some embodiments, a method comprises translating a source code file having a size and a plurality of bytes to obtain a translation error and reducing the size of the source code file by automatically identifying and removing at least one of the plurality of bytes that does not contribute to the translation error to obtain a test case file that is equivalent to the source code file.

BRIEF DESCRIPTION OF THE DRAWINGS

FIG. 4 is a block diagram showing some embodiments of pseudo-code for transforming a source code file.

DETAILED DESCRIPTION OF THE INVENTION

Figure 1:
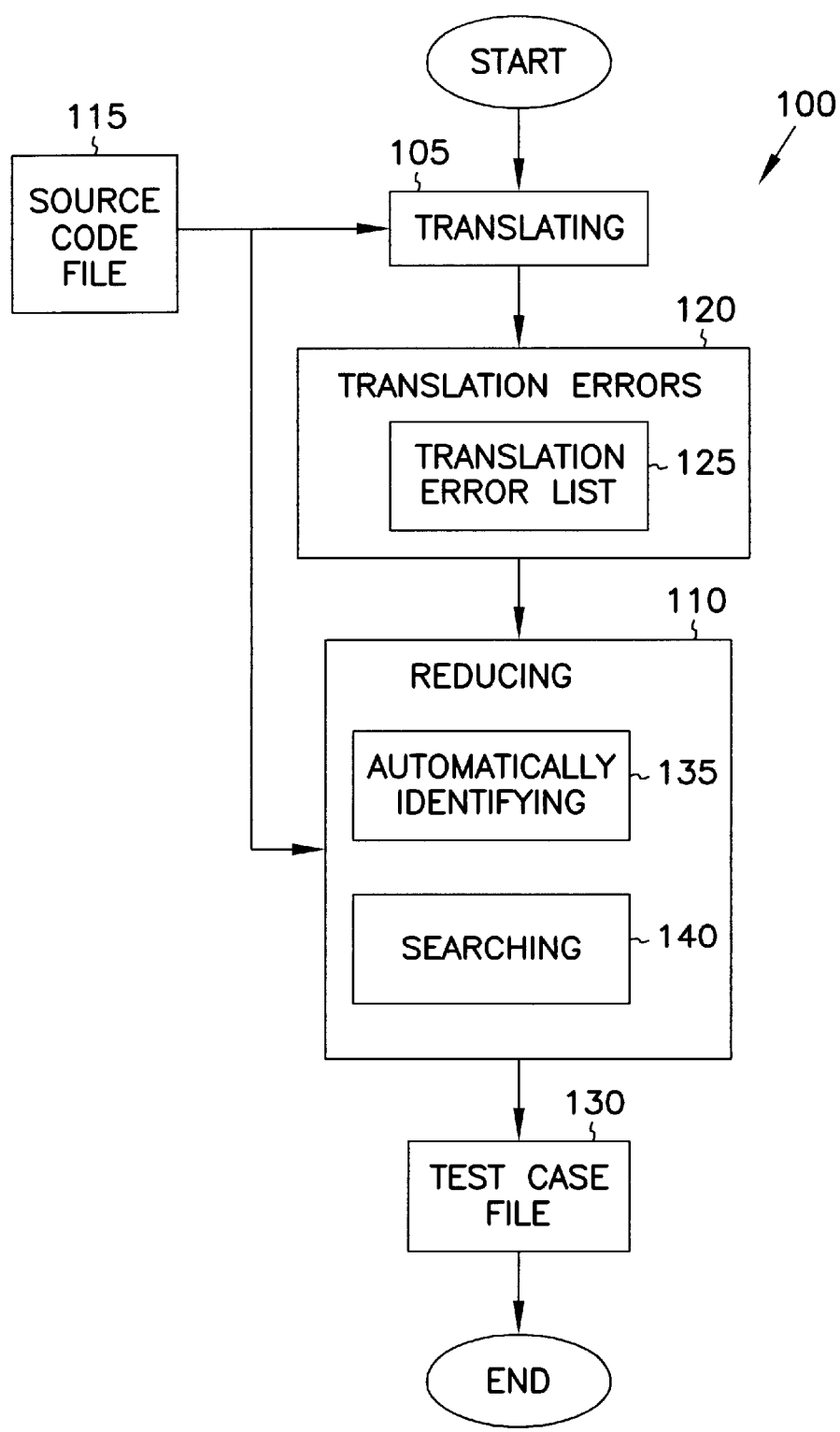
FIG. 1 is a flow diagram showing some embodiments of a method for obtaining a test case file.

FIG. 1 is a flow diagram showing some embodiments of method 100 for obtaining a test case file. Method 100 comprises translating 105 and reducing 110 operations.

A translating 105 operation uses a translator to convert source code file 115 into a translated file. The present invention does not make use of the translated file, but during the process of converting source code file 115 into a translated file, errors may be detected in source code file 115. These errors, known as translation errors 120, are saved by the translator in a translation error list 125. The present invention is not limited to a particular type of translator. Any translator capable of generating a translation error list is suitable for use in connection with the present invention. Some translators suitable for use in connection with the present invention include compilers, assemblers, and interpreters.

A reducing 110 operation, in one embodiment of the present invention, reduces the size of source code file 115 to obtain test case file 130. The present invention is not limited to a particular method or apparatus for reducing a file. Any method or apparatus that is capable of reducing the size of source code file 115 to obtain an equivalent test case file 130 is suitable for use in the present invention. In one embodiment, test case file 130 is equivalent to source code file 115, if an error that appears in translation error list 125 also appears in the translation error list for test case file 130.

Test case file 130, in one embodiment of the present invention, is obtained from reducing 110 by removing at least one byte from source code file 115, such that the resulting test case file 130 generates the same translation error as source code file 115. An approach, in one embodiment, for removing bytes from source code file 115 is to remove bytes starting at the end of the file and working toward the beginning of the file. This approach avoids removing bytes that the translation error may depend upon, prior to identifying the bytes associated with the translation error.

Test case file 130, in an alternate embodiment, is obtained from reducing 110 after parsing source code file 115 into objects, such as NAMESPACE, CLASS, STRUCT, OTHER$_{13}$ DECL, PREPROCESS$_{13}$ CMD, FUNCTION, PROTOTYPE, KR__FUNCTION, and CLASS__PROTOTYPE or similar objects, by removing at least one object from source code file 115, such that the resulting test case file 130 exhibits at least one translation error that matches a translation error exhibited by source code file 115. An approach, in one embodiment, for removing objects from source code file 115 is to remove objects starting at the end of the file and work toward the beginning of the file. This approach avoids removing objects that a translation error may depend upon, prior to identifying the objects associated the translation error.

A reducing 110 operation applied to source code file 115, in an alternate embodiment, is accomplished by automatically identifying 135 a byte to remove from source code file 115. A byte is automatically identified by using a computer program to identify bytes unrelated to a translation error. For example, if the translation error is related to a missing comma in a parameter list for a function, then a byte related to a statement that sums two variables and places the result in a third variable is unrelated to the error of interest. Test case file 130, obtained by removing this byte from source code file 115, when translated, exhibits the same missing comma error as source code file 115.

A reducing 110 operation applied to source code file 115, in another alternate embodiment, is accomplished by automatically identifying 135 an object to remove from source code file 115. An object is automatically identified for removal by using a computer program to identify objects unrelated to a particular translation error. For example, if a translation error is related to a type mismatch in an arithmetic statement, then a computer program is used to automatically identify 135 a function prototype statement for removal. The function prototype statement is unrelated to the arithmetic statement, so the reduced source code file, when translated, exhibits the same type mismatch error as source code file 115.

In another embodiment, the automatic identification of a byte to remove from source code file 115 is accomplished by searching 140 source code file 115 using a binary search. A binary search of source file 115 is performed by searching one-half of source code file 115 at a time. For example, a search is made of the bottom half of source code file 115 to identify a byte that does not contribute to a translation error in source code file 115. In one embodiment, such a byte is identified by translating a copy of source code file 115 that does not contain the identified byte in order to generate an error list, and by comparing the generated error list with the error list associated with the translation of source code file 115. If the translation error appears in both lists, then the copy of source code file 115 that did not contain the identified byte is an equivalent test case file for source code file 115.

In still another embodiment, the automatic identification of an object to remove from source code file 115 is accomplished by searching 140 source code file 115 using a binary search. A binary search of source file 115 is performed by searching one-half of source code file 115 at a time. For example, a search is made of the bottom half of source code file 115 to identify an object that does not contribute to the translation error in source code file 115. In one embodiment, such an object is identified by translating a copy of source code file 115 that does not contain the identified object to generate an error list, and then by comparing the generated error list with the error list associated with the translation of source code file 115. If a translation error appears in both lists, then the copy of source code file 115 that did not contain the identified object is an equivalent test case file for source code file 115.

Method 100 is best understood by describing one cycle of operation. In method 100, translating 105 source code file 115 generates translation error list 125. Reducing 110 source code file 115 generates test case file 130, which is smaller in size than source code file 115. If the translation error list obtained by translating test case file 130 contains a translation error, which is also contained in translation error list 125, then test case file 130 is an equivalent test case for source code file 115.

Figure 2:
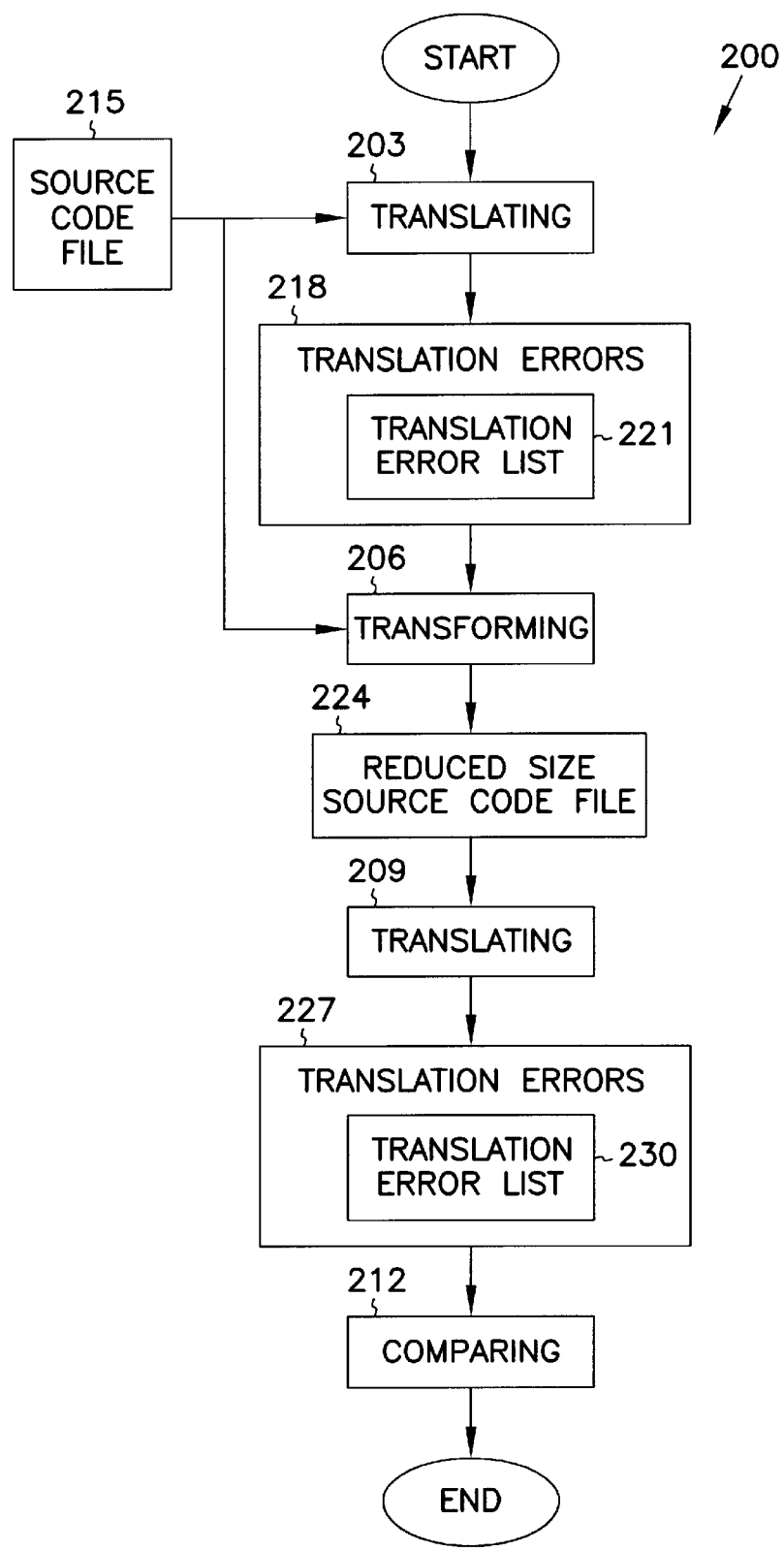
FIG. 2 is a flow diagram showing some embodiments of a method for obtaining a reduced size source code file.

FIG. 2 is a flow diagram showing some embodiments of method 200 for obtaining reduced size source code file 224. Method 200 comprises translating 203, transforming 206, translating 209, and comparing 212 operations.

A translating 203 operation uses a translator to convert source code file 215 into a translated source code file. The present invention does not make use of the translated source code file, but during the process of converting source code file 215 into a translated source code file, errors may be detected in source code file 215. These errors, known as translation errors 218, are saved by the translator in translation error list 221. Again, the present invention is not limited to a particular type of translator. Any translator, such as a compiler, an assembler, or an interpreter, that is capable of generating a translation error list is suitable for use in connection with the present invention.

A transforming 206 operation, in one embodiment of the present invention, reduces the size of source code file 215 to obtain reduced size source code file 224, which is a test case equivalent to source code file 215. The present invention is not limited to a particular method or apparatus for reducing source code file 215. Any method or apparatus that is capable of reducing the size of source code file 215 to obtain reduced size source code file 224, which is a test case equivalent to source code file 215 is suitable for use in the present invention. Reduced size source code file 224 is a test case equivalent to source code file 215, if an error that appears in translation error list 221 also appears in the translation error list for reduced size source code file 224.

A translating 209 operation uses a translator to convert reduced size source code file 224 into a translated file. The present invention does not make use of the translated file, but during the process of converting reduced size source code file 224 into a translated file, errors may be detected in reduced size source code file 224. These errors, known as translation errors 227, are saved by the translator in translation error list 230. The present invention is not limited to a particular type of translator. Any translator that is capable of generating a translation error list is suitable for use in connection with the present invention.

A comparing 212 operation compares source code translation error list 221 to transformed source code translation error list 230. If transformed source code translation error list 230 contains a translation error also contained in source code translation error list 221, then reduced size source code file 224 is an equivalent test case for source code file 215.

Figure 3:
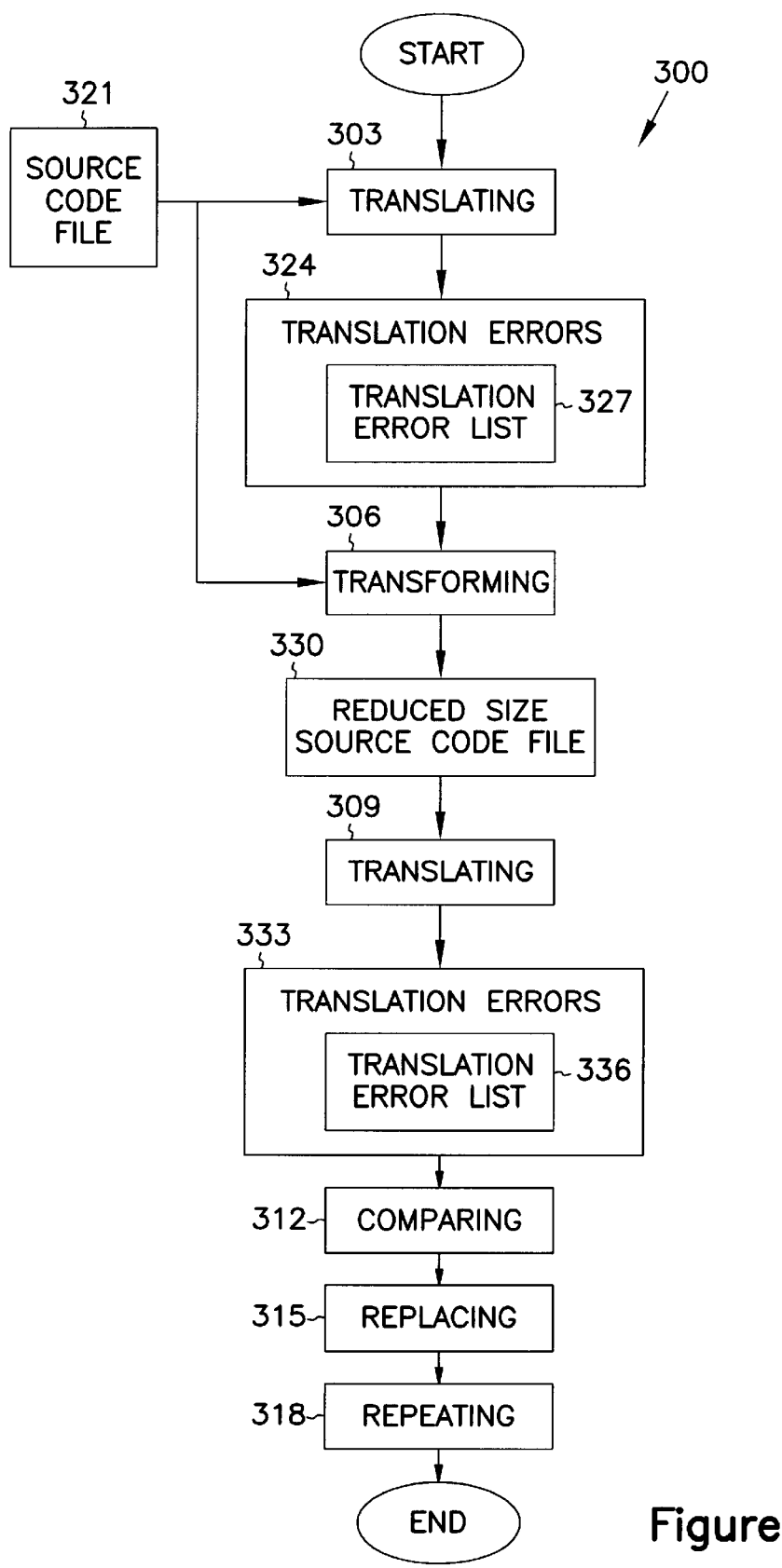
FIG. 3 is a flow diagram showing some embodiments of a method for continuously reducing a source code file to obtain a reduced size source code file.

FIG. 3 is a flow diagram showing some embodiments of method 300 for continuously reducing source code file 321 to obtain reduced size source code file 330. Method 300 comprises translating 303, transforming 306, translating 309, comparing 312, replacing 315, and repeating 318 operations.

A translating 303 operation uses a translator to convert source code file 321 into a translated file. The present invention does not make use of the translated file, but during the process of converting source code file 321 into a translated file, errors may be detected in source code file 321. These errors, known as translation errors 324, are saved by the translator in a translation error list 327. Again, the present invention is not limited to a particular type of translator. Any translator that is capable of generating a translation error list is suitable for use in connection with the present invention.

A transforming 306 operation, in one embodiment of the present invention, reduces the size of source code file 321 to obtain reduced size source code file 330, which is a test case equivalent to source code file 321. The present invention is not limited to a particular method or apparatus for reducing a file. Any method or apparatus that is capable of reducing the size of source code file 321 to obtain reduced size source code file 330, which is a test case equivalent to source code file 321, is suitable for use in connection with the present invention. Reduced size source code file 330 is equivalent to source code file 321, if a translation error that appears in translation error list 327 also appears in the translation error list for reduced size source code file 330.

A translating 309 operation uses a translator to convert reduced size source code file 330 into a translated file. The present invention does not make use of the translated file, but during the process of converting reduced size source code file 330 into a translated file, errors may be detected in reduced size source code file 330. These errors, known as translation errors 333, are saved by the translator in a translation error list 336. The present invention is not limited to a particular type of translator. Again, any translator that is capable of generating a translation error list is suitable for use in connection with the present invention.

A comparing 312 operation compares source code translation error list 327 to transformed source code translation error list 327. If transformed source code translation error list 327 contains a translation error also contained in source code translation error list 327, then reduced size source code file 330 is an equivalent test case for source code file 321.

A replacing 315 operation replaces source code file 321 with reduced size source code file 330, if reduced size source file 330 is a test case that is equivalent to source code file 321. Source code file 321 is replaced in preparation for another pass through transforming 306, translating 309, comparing 312, and replacing 315 operations. Another pass is taken in order to further reduce the size of source code file 321.

A repeating 318 operation causes the repetition of transforming 306, translating 309, comparing 312, and replacing 312 operations, until all objects have been processed.

FIG. 4 is a block diagram showing one embodiment of pseudo-code 400, including FindErrors 405, DivideNConquer 410, and OneAtTime 415, for transforming a source code file.

Referring to FIG. 3 and FIG. 4, FindErrors 405 is the main program for one embodiment of transforming 306, which is shown in FIG. 3. DivideNConquer 410 and OneAtTime 415 are subroutines capable of reducing source code file 321 by removing bytes or objects from source code file 321, reducing files resulting from reducing source code file 321, and reducing sections of source code file 321 and sections of files resulting from reducing source code file 321.

FindErrors 405, in one embodiment, determines whether the file being processed contains more than X objects. FindErrors 405 attempts to remove all objects. If FindErrors 405 is unable to remove all objects, then FindErrors 405 executes a WHILE loop. The WHILE loop is repeated as long as the number of objects is greater than zero. An IF-THEN-ELSE statement is executed within the WHILE loop. If the file or a section of the file being processed contains more than X objects, then FindErrors 405 calls DivideNConquer 410. If the file or the section of the file being processed contains X or fewer objects, then FindErrors 405 and DivideNConquer 410 call OneAtTime 415. The value of X is not critical to the practice of the present invention. In one embodiment, X is set equal to seven, and defines a condition that triggers the execution of OneAtTime 415. Find Errors 405 concludes with the end of the WHILE loop, which is located after the IF-THEN-ELSE statement.

FindErrors 405, in one embodiment, in addition to processing source code file 321, is capable of processing sections of source code file 321 or sub-blocks, such as function bodies, of source code file 321. This processing occurs when the translation error or something on which the translation error depends is within an object that contains separate objects capable of being parsed, such as functions, structures, or classes. Prior to performing this processing, the state of the system is saved, and after this processing completes, the state of the system is restored.

Referring to FIG. 3 and FIG. 4, in one embodiment, DivideNConquer 410, when called, performs a binary search and attempts to remove the last half of source code file 321. If the first half of source code file 321 contains a translation error, then source code file 321 is replaced with the first half of source code 321, and DivideNConquer 410 removes the last half of the new source code file 321. In this way, DivideNConquer 410 never removes code earlier in the file before removing code later in the file. If the last half contains the translation error, then DivideNConquer 410 recursively processes the second half of the source code. After removing the last half of source code file 321, DivideNConquer 410 attempts to remove the first half. If the removal of the first half fails, then the first half is restored, and DivideNConquer 410 recursively processes the first half of source code file 321.

OneAtTime 415 is called when the number of objects or bytes in the file is small. When called, OneAtTime 415 attempts to remove each object or byte in the file from back to front. If removal of the byte or object is successful, and the removed byte or object does not contribute to a translation error, then the source code file is updated. If the removal of the byte or object is unsuccessful, then the source code file is not updated. However, if the removal of an object is unsuccessful and the object removed contains objects capable of being parsed, then FindErrors 405 is called to process those objects.

An advantage of this embodiment of FindErrors 405 is that it is capable of rapidly processing the source code file.

Figure 5:
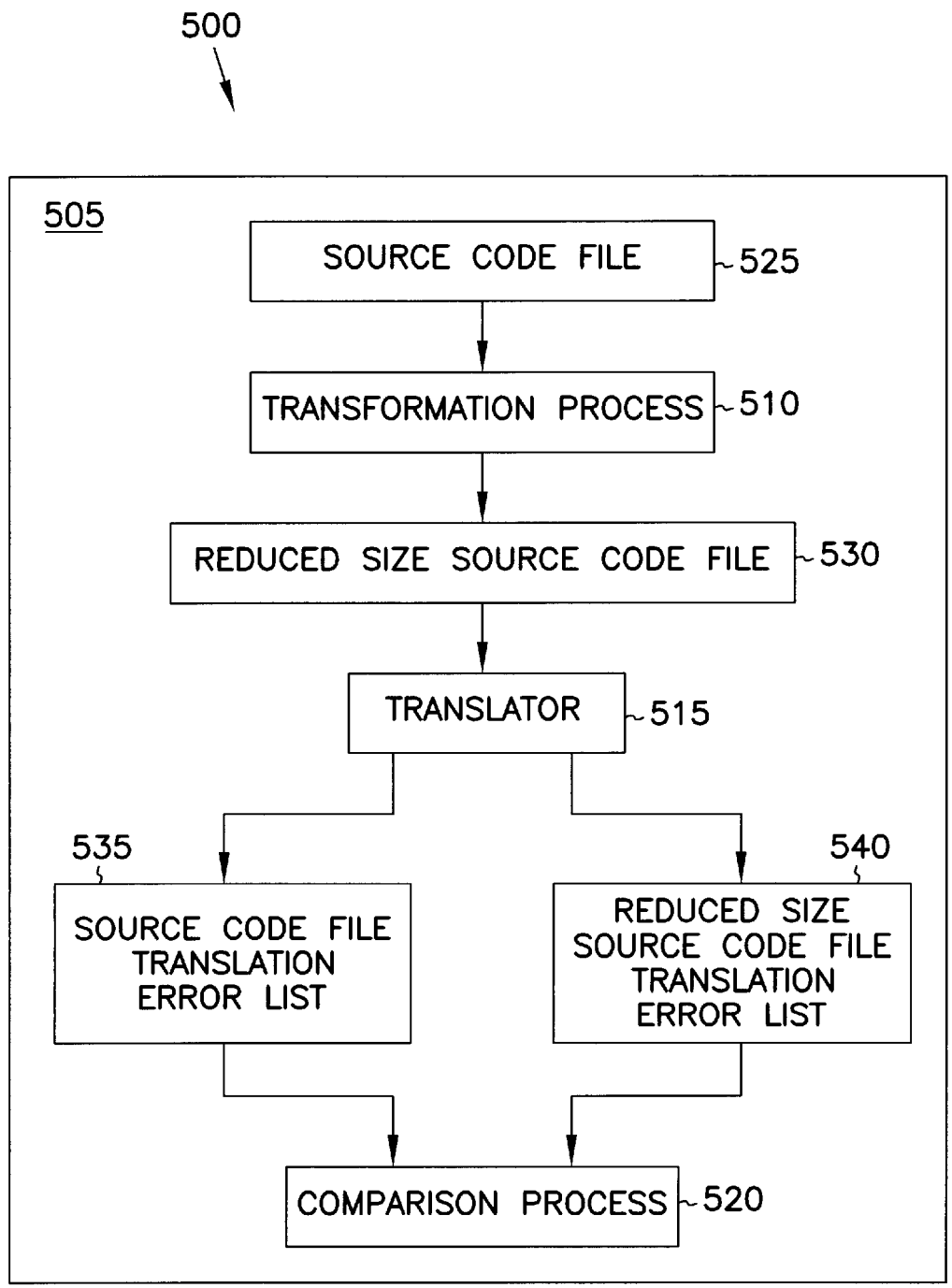
FIG. 5 is a block diagram showing some embodiments of a system for isolating program translation failures.

FIG. 5 is a block diagram showing some embodiments of a system for isolating program translation failures. System 500 comprises processor unit 505, transformation process 510, translator process 515, and comparison process 520. Transformation process 510, translator process 515, and comparison process 520 are processes capable of executing on processor unit 505.

Processor unit 505 is a computer system. Computer systems are known in the art, and the present invention is not limited to a particular type of computer system. Any computer system capable of executing transformation process 510, translator process 515, and comparison process 520 is suitable for use in connection with the present invention.

Transformation process 510 is a process capable of executing on processor 505. In one embodiment, transformation process 510 reduces the size of source code file 525 to obtain reduced size source code file 530. Any of the reducing or transforming processes or methods previously described are suitable for use in this embodiment. For example, transformation process 510 can remove one byte from source code file 525 to obtain reduced size source code file 530. Alternatively, transformation process 510 can remove one object from source code file 525 to obtain reduced size source code file 530. In another embodiment, transformation process 510 can execute a binary search of source code file 530 to identify a byte or object to remove, and repeatedly divide source code file 530 and process the second half of the source code file 530 before processing the first half of the source code file 530.

Translator process 515 is capable of executing on processor unit 505. In one embodiment, translator process 515 translates source code file 525 and reduced size source code file 530 to obtain source code file translation error list 535 and reduced size source code file translation error list 540. These error lists contain translation errors identified in source code file 530 and reduced size source code file 535, respectively. The present invention is not limited to a particular type of translator. Any translator capable of generating a source code file error list from translating a source code file is suitable for use in connection with the present invention.

Comparison process 520 is a process capable of executing on processor unit 505. Comparison process 520 processes source code file translator error list 535 and reduced size source code file translator error list 540 to determine whether reduced size source code file 530 is a test case that is equivalent to source code file 525. The comparison process identifies a translation error in source code file error list 540 and determines whether that error also occurs in reduced size source code file translation error list 540. If the translation error exists in both error lists, then reduced size source code file 530 is a test case that is equivalent to source code file 525.

Figure 6:
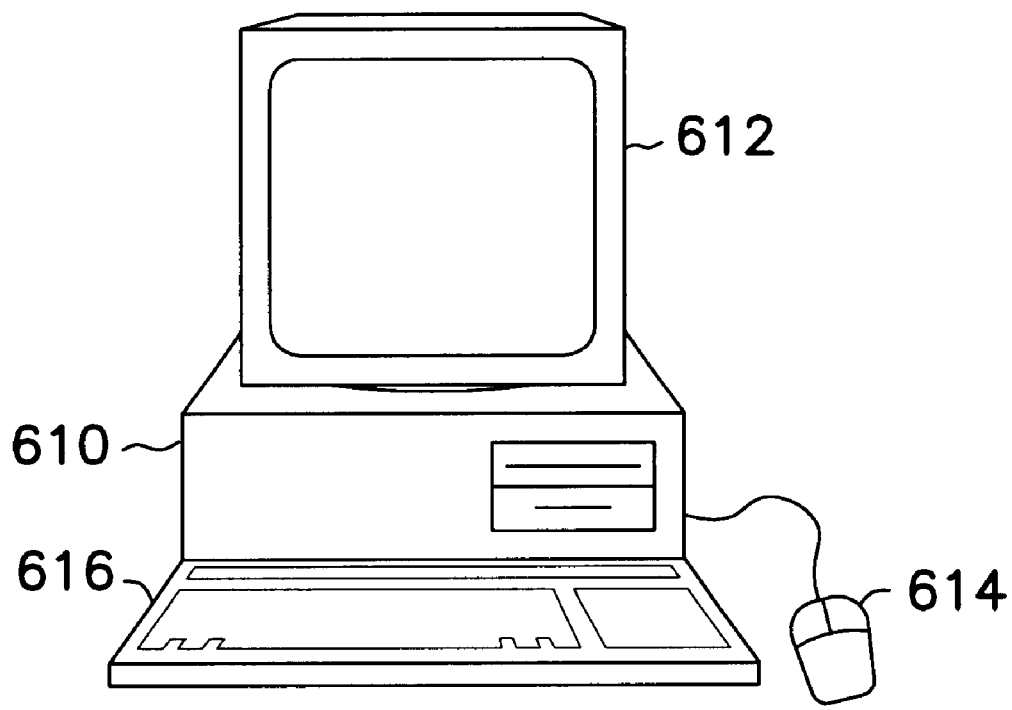
FIG. 6 is a diagram of a computer system on which the present invention may be practiced.

A representative computer, in conjunction with which embodiments of the invention may be practiced, is now described. Those of skill within the art can appreciate, however, that the invention is not limited to implementation in conjunction with this computer. Referring to FIG. 6, a diagram of the computer in conjunction with which embodiments of the invention may be practiced is shown. Computer 610 is operatively coupled to monitor 612, pointing device 614, and keyboard 616. Computer 610 includes a processor, random-access memory (RAM), read-only memory (ROM), and one or more storage devices, such as a hard disk drive, a floppy disk drive (into which a floppy disk can be inserted), an optical disk drive, and a tape cartridge drive. The memory, hard drives, floppy disks, etc., are types of computer-readable media. The invention is not particularly limited to any type of computer 610.

Monitor 612 permits the display of information within a viewing area, including computer, video and other information, for viewing by a user of the computer. The invention is not limited to any particular monitor 612, and monitor 612 is one type of display device that may be used by the invention. Such monitors include cathode ray tube (CRT) displays, as well as flat panel displays such as liquid crystal displays (LCD's). Pointing device 614 permits the control of the screen pointer provided by the graphical user interfaces. The invention is not limited to any particular pointing device 614. Such pointing devices include mouses, touch pads, trackballs, wheels, remote controls and point sticks. Finally, keyboard 616 permits entry of textual information into computer 610, as known within the art, and the invention is not limited to any particular type of keyboard.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A method comprising:
   translating a source code file having a size and a plurality of bytes to obtain a translation error; and
   reducing the size of the source code file by automatically identifying and removing at least one of the plurality of bytes that does not contribute to the translation error to obtain a test case file that is equivalent to the source code file.

2. The method of claim 1, wherein reducing the size of the source code file by automatically identifying and removing at least one of the plurality of bytes that does not contribute to the translation error to obtain a test case file that is equivalent to the source code file comprises:
   searching the source code file for at least one of the plurality of bytes that does not contribute to the translation error by using a computer program to execute a binary search of the source code file.

3. The method of claim 2, wherein searching the source code file for at least one of the plurality of bytes that does not contribute to the translation error by using a computer program to execute a binary search of the source code file comprises:
   automatically executing the computer program immediately after translating the source code file.

4. A method comprising:
   translating a source code file having a size and a plurality of objects to obtain a translation error; and
   reducing the size of the source code file by automatically identifying and removing at least one of the plurality of objects that does not contribute to the translation error to obtain a test case file that is equivalent to the source code file.

5. The method of claim 4, wherein reducing the size of the source code file by automatically identifying and removing at least one of the plurality of objects that does not contribute to the translation error to obtain a test case file that is equivalent to the source code file comprises:
   searching the source code file for at least one of the plurality of objects that does not contribute to the translation error using a computer program to execute a binary search of the source code file.

6. The method of claim 5, wherein searching the source code file for at least one of the plurality of objects that does not contribute to the translation error using a computer program to execute a binary search of the source code file comprises:
   automatically executing the computer program immediately after translating the source code file.

7. A method comprising:
   translating a source code file comprising a plurality of bytes to obtain a source code file translation error list;
   transforming the source code file to obtain a reduced size source code file;
   translating the reduced size source code file to obtain a reduced size source code file translation error list; and
   comparing the source code file translation error list to the reduced size source code file translation error list to determine whether the reduced size source code file is a test case that is equivalent to the source code file.

8. The method of claim 7, wherein transforming the source code file to obtain a reduced size source code file comprises:
   removing at least one of the plurality of bytes from the source code file automatically.

9. The method of claim 7, wherein transforming the source code file to obtain a reduced size source code file comprises:
   identifying at least one of the plurality of bytes as a byte to remove from the source code file; and
   removing the byte from the source code file.

10. A method comprising:
    translating a source code file comprising a plurality of objects to obtain a source code file translation error list;

transforming the source code file to obtain a reduced size source code file;

translating the reduced size source code file to obtain a reduced size source code file translation error list; and comparing the source code file translation error list to the reduced size source code file translation error list to determine whether the reduced size source code file is a test case that is equivalent to the source code file.

11. The method of claim 10, wherein transforming the source code file to obtain a reduced size source code file comprises:

removing at least one of the plurality of objects from the source code file automatically.

12. The method of claim 10, wherein transforming the source code file to obtain a reduced size source code file comprises:

identifying at least one of the plurality of objects as an object to remove from the source code file; and removing the object from the source code file.

13. A method comprising:

translating a source code file comprising a plurality of bytes to obtain a source code file translation error list;

executing a second method comprising:
transforming the source code file to obtain a reduced size source code file;
translating the reduced size source code file to obtain a reduced size source code file translation error list;
comparing the source code file translation error list to the reduced size source code file translation error list to determine whether the reduced size source code file is a test case that is equivalent to the source code file; and
replacing the source code file with the reduced size source code file, if the reduced size source code file is a test case that is equivalent to the source code file; and
repeating the second method until the reduced size source code file reaches a desired size and the reduced size source code file is a test case that is equivalent to the source code file.

14. The method of claim 13, wherein transforming the source code file to obtain a reduced size source code file comprises:

removing at least one of the plurality of bytes from the source code file automatically.

15. The method of claim 13, wherein transforming the source code file to obtain a reduced size source code file comprises:

identifying at least one of the plurality of bytes as a byte to remove from the source code file; and removing the byte from the source code file.

16. A computer readable medium having computer executable instructions for performing a method comprising:

translating a source code file having a size and a plurality of bytes to obtain a translation error; and reducing the size of the source code file by removing at least one of the plurality of bytes that does not contribute to the translation error to obtain a test case file that is equivalent to the source code file.

17. The computer readable medium of claim 16, wherein reducing the size of the source code file by removing at least one of the plurality of bytes that does not contribute to the translation error to obtain a test case file that is equivalent to the source code file comprises:

automatically identifying at least one of the plurality of bytes that does not contribute to the translation error.

18. The computer readable medium of claim 17, wherein automatically identifying a byte that does not contribute to the translation error comprises:

searching the source code file for at least one of the plurality of bytes that does not contribute to the translation error using a computer program to execute a binary search.

19. A computer readable medium having computer executable instructions for performing a method comprising:

translating a source code file comprising a plurality of objects to obtain a source code file translation error list;

transforming the source code file to obtain a reduced size source code file;

translating the reduced size source code file to obtain a reduced size source code file translation error list; and comparing the source code file translation error list to the reduced size source code file translation error list to determine whether the reduced size source code file is a test case that is equivalent to the source code file.

20. The computer readable medium of claim 19, wherein transforming the source code file to obtain a reduced size source code file comprises:

removing at least one of the plurality of objects from the source code file automatically.

21. The computer readable medium of claim 19, wherein transforming the source code file to obtain a reduced size source code file:

identifying at least one of the plurality of objects as an object to remove from the source code file; and removing the object from the source code file.

22. A computer system comprising:

a processor unit;

a transformation process capable of executing on the processor unit, and the transformation process to transform a source code file having a size, a first half, and a second half to a reduced size source code file;

a compiler capable of executing on the processor unit, and the compiler to receive the source code file and to receive the reduced size source code file from the transformation process, to compile the source code file to produce a translation error list and to compile the reduced size source code file to produce a reduced size source code file translation error list; and a comparison process capable of executing on the processor unit, and the comparison process to receive the translation error list and the reduced size source code file translation error list, to compare the translation error list to the reduced size source code file translation error list to determine whether the reduced size source code file is a test case that is equivalent to the source code file.

23. The computer system of claim 22, wherein the transformation process executes a binary search of the source code file in reducing the size of the source code file.

24. The computer system of claim 23, wherein the binary search processes the second half of the source code file before processing the first half of the source code file.

25. A method comprising:

translating a source code file having a size and a plurality of bytes to obtain a translation error; and reducing the size of the source code file by automatically identifying and removing at least one of the plurality of bytes that does not contribute to the translation error and is not redundant or useless to obtain a test case file that is equivalent to the source code file.

26. The method of claim 25, wherein reducing the size of the source code file by automatically identifying and removing at least one of the plurality of bytes that does not contribute to the translation error to obtain a test case file that is equivalent to the source code file comprises:

searching the source code file for at least one of the plurality of bytes that does not contribute to the translation error by using a computer program to execute a binary search of the source code file.

27. The method of claim 26, wherein searching the source code file for at least one of the plurality of bytes that does not contribute to the translation error by using a computer program to execute a binary search of the source code file comprises:

automatically executing the computer program immediately after translating the source code file.

* * * * *